(12) United States Patent
Schumacher et al.

(10) Patent No.: US 11,708,778 B2
(45) Date of Patent: Jul. 25, 2023

(54) FLUID CONTAINER FOR A MOTOR VEHICLE

(71) Applicant: KAUTEX TEXTRON GMBH & CO. KG, Bonn (DE)

(72) Inventors: Nicolai Schumacher, Bonn (DE); David Regier, Birkenbeul (DE); Claas Goedecke, St. Augustin (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 576 days.

(21) Appl. No.: 16/753,430

(22) PCT Filed: Mar. 29, 2018

(86) PCT No.: PCT/EP2018/058239
§ 371 (c)(1),
(2) Date: Apr. 3, 2020

(87) PCT Pub. No.: WO2019/068372
PCT Pub. Date: Apr. 11, 2019

(65) Prior Publication Data
US 2020/0318516 A1    Oct. 8, 2020

(30) Foreign Application Priority Data
Oct. 6, 2017 (DE) .................... 10 2017 217 819.1

(51) Int. Cl.
*F01N 3/20* (2006.01)
*F24H 1/00* (2022.01)
(Continued)

(52) U.S. Cl.
CPC .......... *F01N 3/2066* (2013.01); *F24H 1/009* (2013.01); *F24H 1/0018* (2013.01);
(Continued)

(58) Field of Classification Search
CPC combination set(s) only.
See application file for complete search history.

(56) References Cited

U.S. PATENT DOCUMENTS 8,586,895 B2    11/2013   Haeberer et al.
2012/0311999 A1*   12/2012   Hodgson .............. F01N 3/2066
                                                        220/562
(Continued)

FOREIGN PATENT DOCUMENTS

DE          10256727        6/2004
DE         102006027487     3/2007
(Continued)

OTHER PUBLICATIONS

International Search Report, dated May 24, 2018, received in corresponding PCT Application No. PCT/EP2018/058239.
(Continued)

*Primary Examiner* — Binh Q Tran
(74) *Attorney, Agent, or Firm* — Grossman, Tucker, Perreault & Pfleger, PLLC

(57) ABSTRACT

The invention relates to a fluid container for a motor vehicle, having a container wall that bounds a storage volume for storing liquid with respect to an environment, a heating element that is arranged in the storage volume, and a housing, wherein the housing encloses the heating element in a liquid-tight manner with respect to the supply volume.

18 Claims, 7 Drawing Sheets

(51) Int. Cl.
*F24H 9/1818* (2022.01)
*H05B 1/02* (2006.01)
*H05B 3/18* (2006.01)
*H05B 3/20* (2006.01)
*F01N 3/027* (2006.01)

(52) U.S. Cl.
CPC ......... *F24H 9/1827* (2013.01); *H05B 1/0236* (2013.01); *H05B 3/18* (2013.01); *H05B 3/20* (2013.01); *F01N 3/027* (2013.01); *F01N 2240/10* (2013.01); *F01N 2240/16* (2013.01); *F01N 2550/22* (2013.01); *F01N 2610/10* (2013.01); *F01N 2610/107* (2013.01); *F01N 2610/1406* (2013.01); *F01N 2900/0602* (2013.01); *F01N 2900/18* (2013.01); *F24H 2250/04* (2013.01); *H05B 2203/02* (2013.01); *H05B 2203/021* (2013.01)

(56) References Cited

U.S. PATENT DOCUMENTS

| | | | | |
|---|---|---|---|---|
| 2012/0315196 | A1* | 12/2012 | Maus | F01N 3/2066 422/174 |
| 2013/0025269 | A1* | 1/2013 | Hodgson | F01N 3/2066 137/544 |
| 2013/0037116 | A1* | 2/2013 | Crary | B01D 35/027 137/544 |
| 2013/0255234 | A1* | 10/2013 | Bauer | F01N 3/208 60/287 |
| 2016/0138455 | A1 | 5/2016 | Chini et al. | |
| 2017/0159524 | A1 | 6/2017 | Dehrmann | |
| 2017/0284261 | A1* | 10/2017 | Maguin | F01N 3/2807 |
| 2018/0045098 | A1 | 2/2018 | Hwang et al. | |

FOREIGN PATENT DOCUMENTS

| | | | |
|---|---|---|---|
| DE | 102008011464 | 9/2009 | |
| DE | 102009046954 | 5/2011 | |
| DE | 102014108074 | 12/2015 | |
| DE | 102014223517 | 5/2016 | |
| EP | 3168075 | 5/2017 | |
| FR | 3038000 | 12/2016 | |
| WO | WO-2009077067 A1 * | 6/2009 | .............. B60S 1/488 |
| WO | WO-2011032709 A1 * | 3/2011 | ........... F01N 3/2066 |
| WO | 2016/137215 | 9/2016 | |

OTHER PUBLICATIONS

International Preliminary Report on Patentability, dated Apr. 16, 2020, received in corresponding PCT Application No. PCT/EP2018/058239.

\* cited by examiner

FLUID CONTAINER FOR A MOTOR VEHICLE

FIELD

The present invention relates to a liquid container for a motor vehicle.

BACKGROUND

In modern motor vehicles, aqueous operating liquids are used for example for increasing the engine power or for reducing pollutant emissions. In this regard, systems for injecting water into the combustion chamber or SCR systems for exhaust-gas aftertreatment are known.

The aqueous operating liquids carried in a liquid container can freeze at correspondingly low outside temperatures. In such a case, rapid thawing of the aqueous operating liquid is necessary to allow conveyance and to supply the liquid to the corresponding systems.

For this purpose, it is known to arrange heating devices in a storage volume of the liquid container. Here, the challenge is to protect the heating device from mechanical damage due to ice pressure, or due to the impact of pieces of ice that undergo acceleration induced by driving dynamics. The challenge of leading an energy supply means for the heating device from the storage volume to the outside in a manner sealed off so as to be media-resistant for the purpose of connection to an energy source furthermore arises.

Against this background, the invention is based on the technical problem of specifying an improved liquid container, for which the above-described challenges are at least partially met and which has, in particular, protection against mechanical damage to the heating device and an energy supply means which is sealed off so as to be media-resistant.

SUMMARY

The invention relates to a liquid container for a motor vehicle, having a container wall, which delimits with respect to surroundings a storage volume for storing liquid, having a heating element, which is arranged in the storage volume, and having a housing, wherein the housing encloses the heating element in a liquid-tight manner with respect to the storage volume.

The heating element is protected by the housing from mechanical damage or chemical damage due to liquid contact.

According to one configuration of the invention, exactly one single heating element may be provided in the liquid container. This has the advantage that merely one heating element has to be integrated into the liquid container and supplied with energy.

Alternatively, it may be provided that two or more heating elements are arranged in the storage volume. This has the advantage that the heating elements, in terms of their dimensions and their spatial arrangement in the storage volume, can be integrated into the liquid container as compactly as possible.

According to a further configuration, the liquid container is characterized by a cable leadthrough, wherein at least one cable for the supply of energy to the heating element is led from the heating element into the surroundings of the liquid container, wherein the cable leadthrough has a first passage opening, which is formed on the housing, and has a second passage opening, which is formed on the container wall, and wherein, in the region of the cable leadthrough, the housing and the container wall are connected in a liquid-tight manner.

The housing and the container wall accordingly delimit the cable with respect to the storage volume such that no liquid contact can occur between liquid received in the storage volume during the operation of the liquid container and the cable. Furthermore, the connection between the housing and the container wall forms a seal of the storage volume with respect to the surroundings, with the result that, in the region of the connection between the housing and the container wall, no liquid is leaked to the surroundings.

According to a further configuration of the liquid container, it is provided that a profile extending in the direction of the heating element is integrally formed on the container wall, wherein the profile delimits the second passage opening, and wherein the profile, at an end side, is welded in a liquid-tight manner, and/or locked with detent action in a liquid-tight manner, to the housing.

Thus, by welding the profile to the housing, it is possible to provide a reliable liquid-tight connection in an inexpensive and simple manner. Alternatively, it may be provided that liquid-tight, in particular mechanical, locking with detent action is formed between the profile and the housing, for which sealing is realized for example by a silicone or elastomer seal, such as an O-ring or the like. In this way, a non-destructively releasable connection between the profile and the housing can be provided, in order for example for maintenance or repair work to be carried out.

In order to protect the heating element from environmental influences, in the region of the first passage opening, the housing may be sealed off with respect to the surroundings. For this purpose, the cable may, for example, be encapsulated with a plastic material of the housing or be cast in the housing or be sealed off with the aid of sealing material which is introduced at a later stage into the region of the passage opening. Liquid- and/or dust- and/or gas-tight sealing of the first passage opening can be achieved in particular in that the heating element is, together with the cable, encapsulated with plastic in an injection molding process, wherein the plastic, which substantially completely encloses the heating element, forms the housing.

According to a further embodiment of the liquid container, it is provided that a plug-in connector provided at one cable end of the cable is able to be led through the second passage opening. For this purpose, the plug-in connector in question may have for example a maximum diameter which is smaller than the minimum diameter of the second housing opening. In this way, it is possible in a simple manner for the heating element preassembled with plug-in connector and housing to be fitted on a half-shell, having the second passage opening, of the liquid container such that the plug-in connector is led from a side, facing the storage volume, of the half-shell into surroundings facing away from the storage volume through the second passage opening, and the heating element is, together with the housing, placed into the half-shell and/or connected in a materially bonded and/or mechanical manner to the half-shell.

It may be provided that the housing and the container wall are welded to one another by means of a welding ring. The welding ring may consist of a plastic, or comprise a plastic, which is able to be welded to the material of the container wall and to the material of the housing. The welding ring may for example be a polyethylene ring.

The welding ring may comprise for example two or more plastic components.

The welding ring may have two plastic components, with a first plastic component being welded to the container wall and the second plastic component being welded to the housing.

For the purpose of connecting the housing to the container wall in a materially bonded and liquid-tight manner, the housing may firstly be fitted on the container wall or placed onto an inner side, facing the storage volume, of the container wall or onto support elements of the latter. Afterwards, regions to be welded of the container wall, of the housing and of the welding ring are heated. For the heating, use may be made of a heating reflector. The welding ring is, with its heated region, pressed onto the heated regions of the container wall and of the housing in order to establish a materially bonded connection. It is thus possible for a gap formed between the housing wall and the container wall to be bridged and to be sealed in a liquid-tight manner with respect to the surroundings. In particular the heated regions are in an at least partially plasticized or an at least partially melted state during the welding.

That region of the welding ring which is intended for the welding to the housing and the container wall may have an annular planar surface. Alternatively or additionally, the welding ring may be of stepped form in order for an offset between the regions, or surfaces, to be welded of the housing and the container wall to be bridged.

The welding ring may have an arrangement of welding webs which, prior to the establishment of the weld connection, are partially or completely melted in order to fill welding gaps formed with respect to the housing and the container wall during the welding.

According to a further configuration of the liquid container, it is provided that the housing has a housing collar, which delimits the first passage opening and extends in the direction of the surroundings in a manner facing away from the heating element and, at least sectionally, extends within the second passage opening, wherein the housing collar is welded to the container wall by means of the welding ring.

For example, an end side of the housing collar may be arranged at the height of an outer side, facing the surroundings, of the container wall, with the result that the housing collar completely passes through the second passage opening. The outer side of the container wall and the end side of the housing collar may in this case be connected in a simple manner by means of a welding ring since the surfaces to be welded are visible and accessible prior to the welding.

Alternatively or additionally, it may be provided that the container wall has a wall collar, which delimits the second passage opening and extends in the direction of the surroundings in a manner facing away from the heating element, wherein the wall collar is welded to the housing by means of the welding ring.

For example, it may be provided that the wall collar at least sectionally or completely encloses an above-described housing collar on the circumferential side. The wall collar and the housing collar may each have an end surface which faces the surroundings and which is in each case welded to the welding ring. In particular, the end surfaces may be arranged at the same height, that is to say within a plane, with the result that simultaneous heating and welding to the welding ring is made possible in a simple manner.

According to a further, alternative configuration of the liquid container, it is provided that at least one cable for the supply of energy to the heating element is led from the heating element to a plug-in connector, wherein the plug-in connector has a connection region which is arranged outside the storage volume and which faces surroundings of the liquid container, and wherein the plug-in connector is, in the region of a passage opening of the container wall, connected in a liquid-tight manner to the container wall and closes off the passage opening in the manner of a plug.

The plug-in connector accordingly forms both the seal of the wall and an interface for the supply of energy to the heating element. It is thus possible in a simple manner for media-resistant sealing of the liquid container to be realized, wherein the interface for the supply of energy in the form of the plug-in connector is integrated in a compact manner into the wall of the liquid-tight container.

In order to establish an inexpensive and reliable liquid-tight connection, the plug-in connector may have a peripheral collar, which is arranged within the storage volume and is connected in a materially bonded and liquid-tight manner to a collar, facing the storage volume, of the wall. For this purpose, the peripheral collar of the plug-in connector may be welded to the collar of the wall. Alternatively or additionally, the collar of the plug-in connector may be adhesively bonded to the collar of the wall.

Alternatively or additionally, the plug-in connector may, at least sectionally, be seated in the passage opening of the wall. In this case, the abovementioned collar may for example be arranged within the storage volume while an opening or a projecting plug contact faces the surroundings, in order to be connected to a plug-in connector which is associated therewith or is formed in a complementary manner. The plug-in connector accordingly passes through the wall in the region of the passage opening.

According to a further configuration of the liquid container, it is provided that a plurality of support elements, such as webs, struts or the like, extend from the container wall in the direction of the heating element, wherein the housing bears on the support elements, and/or is connected to the support elements, such that the heating element is at a distance from the container wall.

Due to the merely local bearing of the heating element or of the housing on the support elements, the housing can be washed around substantially freely by liquid to be stored in the storage volume, with the result that the heating element or the housing is able to emit heat to the medium to be heated in every spatial direction. It is thus possible for rapid and reliable thawing of the medium to be stored, such as aqueous operating liquid, to be achieved at low temperatures.

It may be provided that the housing is welded, adhesively bonded, or mechanically locked with detent action, to one or more support elements so as to fix the housing within the storage volume. In this way, the arrangement of the heating element can be fixed in the storage volume and protected from damage relating to driving dynamics.

The support elements may have planar bearing regions in which the housing at least sectionally bears thereon in a sheetlike or planar manner.

The heating element may be a plate-type heating means. This means that a length and width of the heating element in each case correspond to a multiple of the height or wall thickness of the heating element, with the result that the heating element is a planar component.

Alternatively or additionally, the heating element is a PTC heating element. This means that the heating element, with respect to temperature, behaves in the manner of a PTC element. In this case, it is advantageous that no additional control technology for controlling the input of heat is required, since overheating of the heating element is avoided by way of the temperature behavior of the heating element with positive temperature gradients.

Alternatively or additionally, the heating element may be a PTC heating polymer provided with electrodes. The polymer, with respect to temperature, behaves here in the manner of a PTC element, so that the PTC heating polymer can be heated with the aid of the electrodes. It is again the case that, due to the positive temperature gradients, no additional control technology is required to avoid overheating of the heating element.

The heating element may in particular be a rigid plate, wherein "rigid" is to be interpreted so as to mean that the heating element, together with the housing, is not pliable or cannot be deformed in a substantially non-destructive manner.

It may be provided that the heating element is, at least sectionally, at a distance from the container wall, which delimits the storage volume. For this purpose, as already described above, the housing may bear on support elements or be connected to support elements. In this way the heating element, in the installation position in the fully fitted state, can be installed in particular in a horizontally oriented manner in a vehicle. Alternatively, it may be provided that the housing is arranged in an inclined manner within the storage volume and, for example, with a first edge, bears against a bottom shell of the liquid container or is arranged closely adjacent to a bottom shell of the liquid container, and, with a second edge, bears against a top shell of the liquid container or is arranged closely adjacent to a top shell of the liquid container. This allows reliable thawing of ice layers to be achieved independently of fill level, wherein moreover it is possible to avoid formation of unventilated cavities within the storage volume that are arranged locally around the heating element.

Alternatively or additionally, it may be provided that the heating element spans at least 20% of the surface of the container base of the container wall. In particular, it may be provided that the heating element spans at least 30% or more of the surface of a container base of the container wall. In this way, it is possible to ensure rapid areal thawing or heating of liquid stored in the storage volume, in particular aqueous operating liquid.

Alternatively or additionally, it may be provided that the heating element and the housing have passage openings, and/or cutouts, in which shaped elements or functional units of the liquid container are arranged. This makes it possible to specify in particular a planar, single-part heating element without compromising the possibilities for the arrangement of baffle walls, valves, lever-type sensors or the like within the liquid container.

It may be provided that, as already mentioned, the heating element is cast in the housing. In this way, on the one hand it can be ensured that the housing can be integrated into the storage volume of the liquid container so as to be situated close to the heating element, in particular in a gap-free manner, and thus in a compact manner. On the other hand, reliable and inexpensive protection from chemical and/or mechanical damage of the heating element is ensured in a simple manner. The housing may for example be a housing which comprises HDPE (high-density polyethylene) and/or PP (polypropylene), or consists of HDPE and/or PP. In particular, the housing may comprise a plastic which is able to be welded in a homogeneous manner to the to a plastic of the container wall of the liquid container. The liquid container may have a single- or multi-layer wall structure having one or more plastic layers.

The housing may be formed in one piece, in particular for the case in which the heating element is cast in a plastic of the housing.

Alternatively, the housing may be of at least two-part form and have a bottom shell, into which the heating element is placed and possibly welded in a sealing manner, and a top shell, which in turn is welded to the bottom shell in order to enclose the heating element in a liquid-tight manner. Alternatively, such an arrangement of top and bottom shells of the housing may be connected releasably by way of screwing and sealing and provided so as to be liquid-tight.

A wall thickness of the housing may lie between 0.5 mm, inclusive, and 3 mm, inclusive. This makes it possible to realize reliable sealing and reliable protection from mechanical stress.

It may be provided that a sleeve which faces away from the storage volume is, as transport protection and/or an assembly aid for cables, plug-in connectors, contacts or the like, fastened to the housing. Alternatively or additionally, it may be provided that a sleeve which faces away from the storage volume, in particular the same sleeve, is, as part of the housing, connected in a liquid-tight manner to the container wall, in particular that an end section, facing away from the heating element, of the sleeve is welded, and/or adhesively bonded, in a liquid-tight manner to the container wall.

If the intention is for the housing to be welded to the container wall by means of a welding ring and, moreover, the sleeve is fastened to the housing as transport protection, a heating reflector for heating those regions of the housing and of the container wall which are to be welded to the welding ring, which heating reflector has a passage opening for leading the sleeve through, may be provided. In this way, despite the fitted sleeve, the heating reflector can be positioned close to the container wall and the housing, wherein, when being brought up to the container wall and to the housing, the heating reflector can be slid by way of its passage opening on the sleeve, so that the sleeve passes through the heating reflector.

According to a further configuration of the liquid container, it is provided that provision is made on the container wall of at least one rib, which forms a stop for the positioning of the housing within the storage volume. Such a rib may serve as a form-fitting lateral delimitation for the purpose of preventing lateral displacement of the housing relative to the container wall on account of forces induced by driving dynamics. If there is formed between the housing and the container wall for example a weld connection, the weld connection can be relieved of load during the driving of a motor vehicle in that the forces resulting from the driving dynamics are supported and absorbed by the rib.

In the fully fitted state in the installation position of the liquid container in a motor vehicle, the rib may therefore serve as a stop for the housing within the storage volume, which, in a form-fitting manner, prevents a horizontal relative movement of the housing with respect to the container wall.

A further configuration of the liquid container is characterized by two or more ribs which are assigned to sides of the housing that face away from one another, and border the housing at least on two sides, wherein the ribs bear in particular against the sides of the housing that face away from one another. The housing is therefore held in a form-fitting manner between the ribs.

It may be provided that the ribs form resilient webs, which, as soon as the housing is fitted, are clamped in a resiliently elastic manner against the housing. In this way, the housing can be fixed in a form- and force-fitting manner on the container wall.

It may be provided that at least one rib is configured to produce a clip-type or snap-action connection to the housing. The rib may thus have, at an end side, a projection or barb on an arm which is formed in the manner of a projecting resilient web, said projection or barb being able to be locked with detent action to the housing. In particular, the housing may be inserted into an arrangement of ribs that is matched to the outer contour of the housing and locked with detent action to said arrangement. Consequently, the housing can be fixed in a form- and force-fitting manner on the container wall.

Alternatively or additionally, the liquid container may have at least one holding-down means, provided on the container wall, which forms a stop for the positioning of the housing within the storage volume. While the ribs, in the installation position of the liquid container, are configured to prevent a horizontal relative movement between the container wall and the housing, the holding-down means may serve for preventing a vertical relative movement of the housing with respect to the container wall. In particular, the housing may be fixed, in particular clamped, between a holding-down means provided on a top shell of the liquid container and a support element provided on the bottom shell of the liquid container.

Two or more holding-down means spaced apart from one another may be provided for the purpose of reliably positioning the housing relative to the container wall.

As already discussed above, the heating element may be a plate-type heating means. Alternatively, the heating element may have two or more bar-like segments which are arranged with an angular offset in a fan-like manner and/or are arranged in a row in a chain-like manner.

The heating element can thus be matched to the arrangement of the functional units arranged within the storage volume, such as pumps, lever-type sensors or the like, or structural elements, such as standoffs, baffle walls or the like.

The bar-like segments may have electromechanical connection means which act in a form- and/or force-fitting manner, such as a detent connection, a snap-action connection, a press-stud connection or the like, in order for the bar-like segments to be connected to one another and electrically contacted with one another.

BRIEF DESCRIPTION OF THE DRAWINGS

The invention will be described in more detail below on the basis of a drawing, which illustrates exemplary embodiments. In the drawing, in each case schematically.

DETAILED DESCRIPTION

Figure 1:
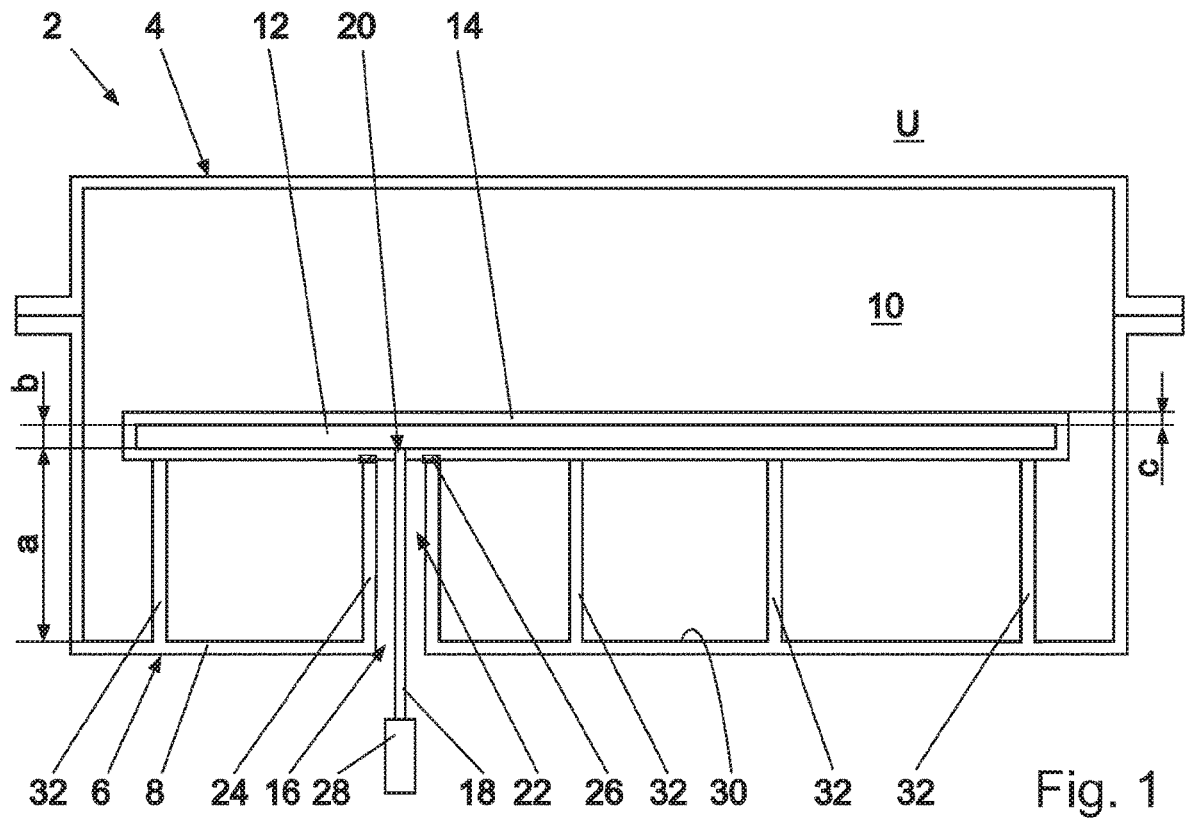
FIG. 1 shows a liquid container according to the invention.

FIG. 1 shows a liquid container 2 for a motor vehicle in a cross section. The liquid container 2 has a top shell 4 and a bottom shell 6. The top shell 4 and the bottom shell 6 are welded to one another. In the present case, the top shell 4 and the bottom shell 6 consist of plastic.

The top shell 4 and the bottom shell 6 form a container wall 8, which delimits with respect to surroundings U a storage volume 10 for storing liquid.

It goes without saying that the liquid container 2 has the usual inlets and outlets (not illustrated here) for liquid extraction, for filling and/or for deaeration of the container.

The liquid container 2 has a heating element 12, which is arranged in the storage volume 10. The liquid container 2 has a housing 14, which is likewise arranged in the storage volume 10, wherein the housing 14 encloses the heating element 12 in a liquid-tight manner with respect to the storage volume 10.

The liquid container 2 has a cable leadthrough 16, wherein at least one cable 18 for the supply of energy to the heating element 12 is led from the heating element 12 into the surroundings U of the liquid container 2. The cable leadthrough 16 has a first passage opening 20, which is formed on the housing 14. The cable leadthrough 16 has a second passage opening 22, which is formed on the wall 8 of the bottom shell 6. In the region of the cable leadthrough 16, the housing 14 and the wall 8 are connected in a liquid-tight manner, welded to one another in the present case.

A profile 24 extending in the direction of the heating element 12 is thus integrally formed on the container wall 8, wherein the profile 24 delimits the second passage opening 22, and wherein the profile, at an end side, is welded in a liquid-tight manner to the housing 14. A peripheral weld connection 26 is formed between the housing 14 and the profile 24. As a result of the weld connection 26, the storage volume 10 is delimited in a liquid-tight manner with respect to the surroundings U in the region of the cable leadthrough 16.

The housing 14 is furthermore sealed off with respect to the surroundings U in the region of the first passage opening 20, so as to protect the heating element 12 from environmental influences. For this purpose, the heating element 12 has, together with the cable 18, been cast in the housing 14.

A plug-in connector 28 provided at one cable end of the cable 18 is able to be led through the second passage opening 22. It is thus possible for the heating element 12 to be cast with the cable in the housing 14 and, prior to the fitting of the top shell 4, placed into the bottom shell 6, wherein the plug-in connector 28 is led through the second passage opening 22.

The heating element 12 is designed as a plate-type heating means 12 in the present case and consists of a PTC heating polymer. The heating element 12 is at a distance a from the container wall 8, which delimits the storage volume 10. The distance a is greater than twice the wall thickness b of the heating element 12 designed as a plate-type heating means. The heating element 12 spans more than 30% of the surface of a container base 30 of the container wall 8.

According to the variant in FIG. 1, the housing 14 is formed in one piece and, apart from the region of the first passage opening 20, fully encloses the heating element 12.

The liquid container 2 further has a plurality of support elements 32, which extend from the container wall 8 in the direction of the heating element 12. The housing 14 bears on the support elements 32 and is connected in a materially bonded manner to the support elements 32. The support elements 32 define the distance a.

The housing 14 consists of a plastic in the present case and is welded in a homogeneous manner to the container wall 8. The wall thickness c of the housing is 2 mm in the present case. (Wall thickness c)

Figure 2:
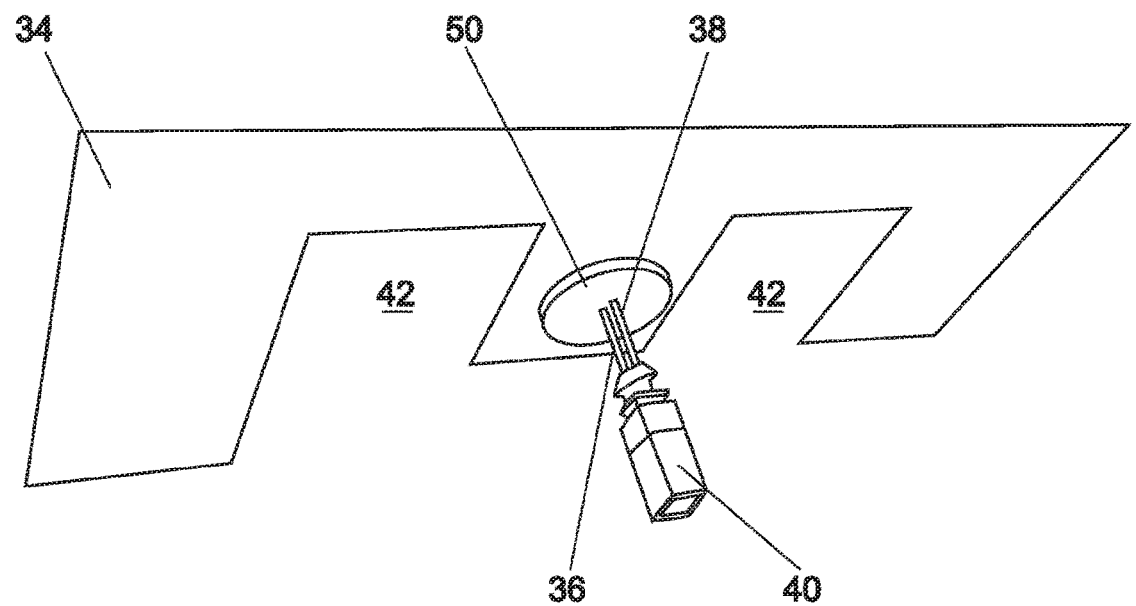
FIG. 2 shows a heating element.

FIG. 2 shows a further heating element 34 for a liquid container according to the invention. The heating element 34 is connected to a plug-in connector 40 via cables 36, 38. The heating element 34 has cutouts 42, which leave space free within a storage volume for functional units or for structures projecting into the storage volume, such as baffle walls or the like.

Figure 3:
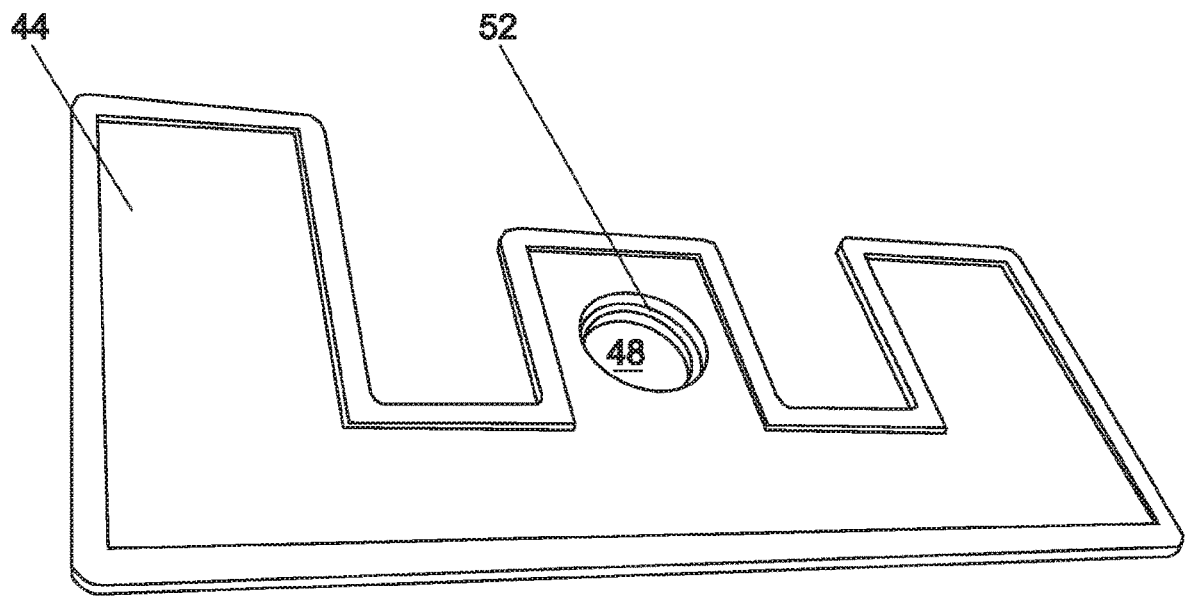
FIG. 3 shows a housing shell.

FIG. 3 shows a bottom shell 44 of a housing 46 that is configured to receive the heating element 34 together with cables 36, 38 and a plug-in connector 40. The bottom shell 44 has a first passage opening 48 for leading through the plug-in connector 40 and the cables 36, 38. A shaped element 50 (FIG. 2) formed between the plug-in connector 40 and the heating element 34 is configured to be received in a peripheral collar 52 of the passage opening 48 and to be connected in a liquid-tight manner to the collar 52.

Figure 4:
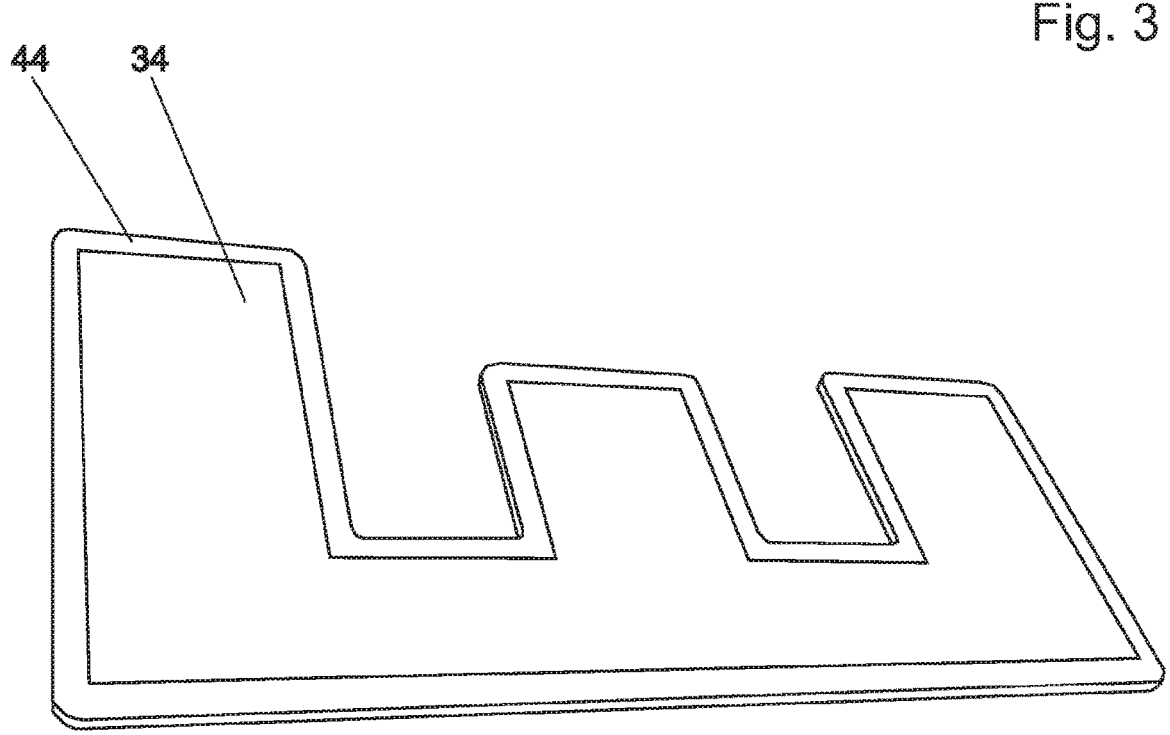
FIG. 4 shows the housing shell from FIG. 3 with the heating element from FIG. 2.

FIG. 4 shows the heating element 34, which is received in the bottom shell 44. It goes without saying that the bottom shell 44 can be provided independently of and separately from the heating element 34, or else can be formed by encapsulation of the heating element 34.

Figure 5:
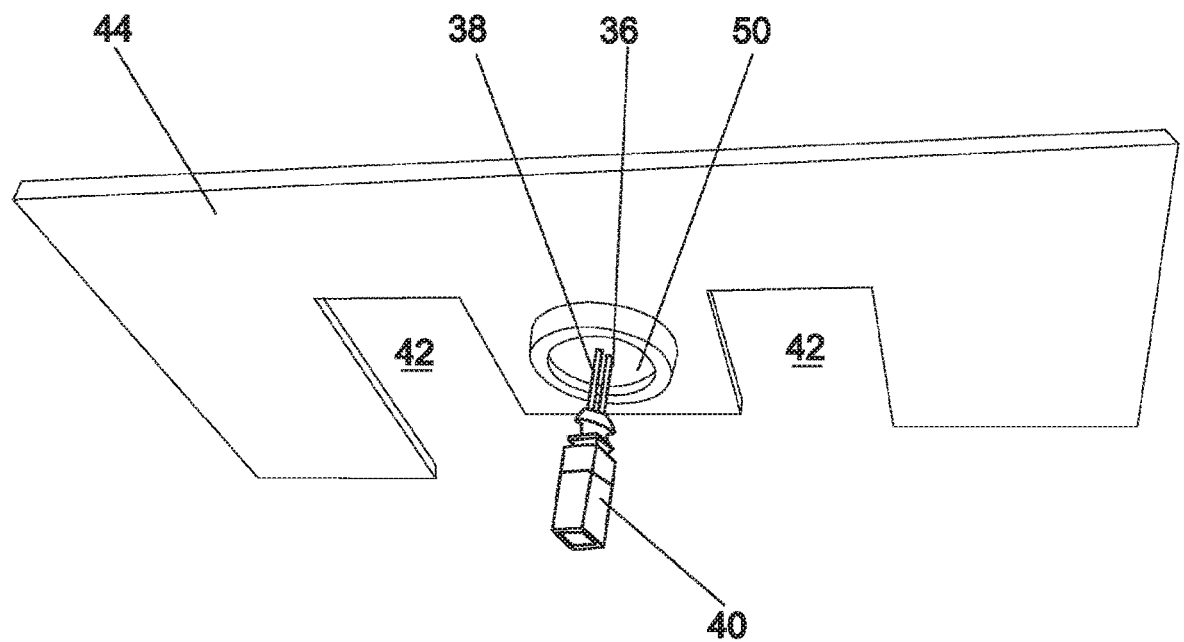
FIG. 5 shows the housing shell from FIG. 3 with the heating element from FIG. 2.

FIG. 5 shows the bottom shell 44 with the heating element 34 in a perspective view from below.

Figure 6:
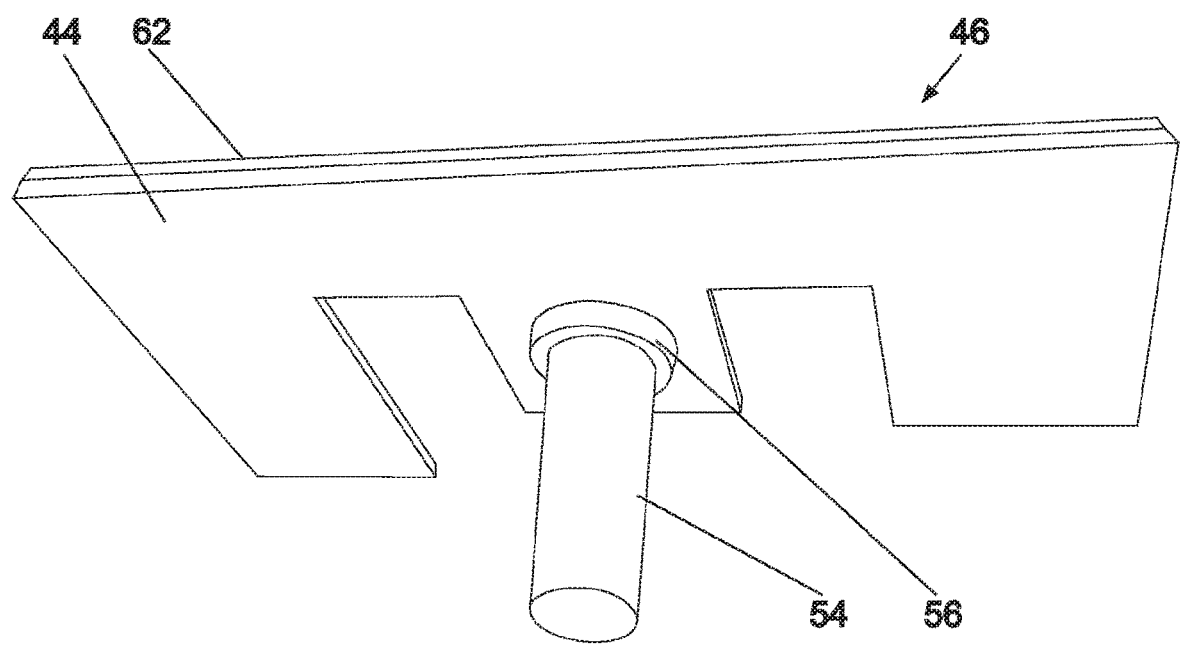
FIG. 6 shows a housing with a sleeve.

FIG. 6 shows the heating element 34 which is then fully received in the housing 46, wherein a top shell 52 has then been added to the bottom shell 44 such that the heating element 34 is fully enclosed by the housing 46. In the present case, the plug-in connector 40 and the cables 36, 38 are enclosed by a sleeve 54, so as to protect the plug-in connector 40 and the cables 36, 38 from damage during the fitting of or the welding to a half-shell of a liquid container. The sleeve 54 may remain on the housing 46 as transportation protection until the final fitting in a motor vehicle.

According to alternative embodiments of the invention, the sleeve 54 may remain on the housing 46 as a constituent part of the housing 46 and, with a sleeve end facing away from the heating element, be welded in a liquid-tight manner to a bottom shell 6 (cf. FIG. 1).

With the aid of the peripheral collar 56, the housing 46 can be welded to a profile of a second passage opening of a half-shell of a liquid container, as is illustrated by way of example in FIG. 1.

Figure 7:
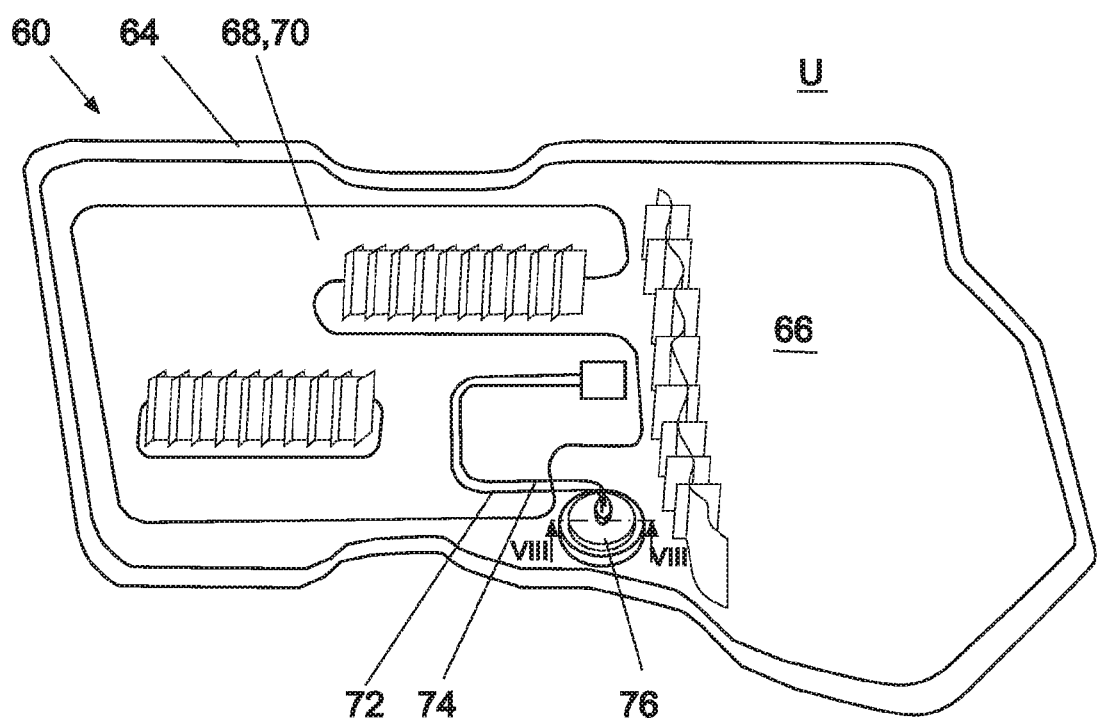
FIG. 7 shows a half-shell of a further liquid container according to the invention.

FIG. 7 shows a lower half-shell 60 of a further liquid container according to the invention, which has a container wall 64, which delimits with respect to surroundings U a storage volume 66 for storing liquid, a heating element 68, which is arranged in the storage volume 66, and a housing 70, wherein the housing 70 encloses the heating element 68 in a liquid-tight manner with respect to the storage volume 66.

For the supply of energy to the heating element 68, cables 72, 74 are led from the heating element 68 to a plug-in connector 76. The plug-in connector has a connection region 78 which is arranged outside the storage volume 66 and which faces surroundings U of the liquid container. The plug-in connector 76 is connected in a liquid-tight manner to the container wall 64 in the region of a passage opening 80 of the container wall 64. The plug-in connector 76 closes off the passage opening 80 in the manner of a plug.

Figure 8:
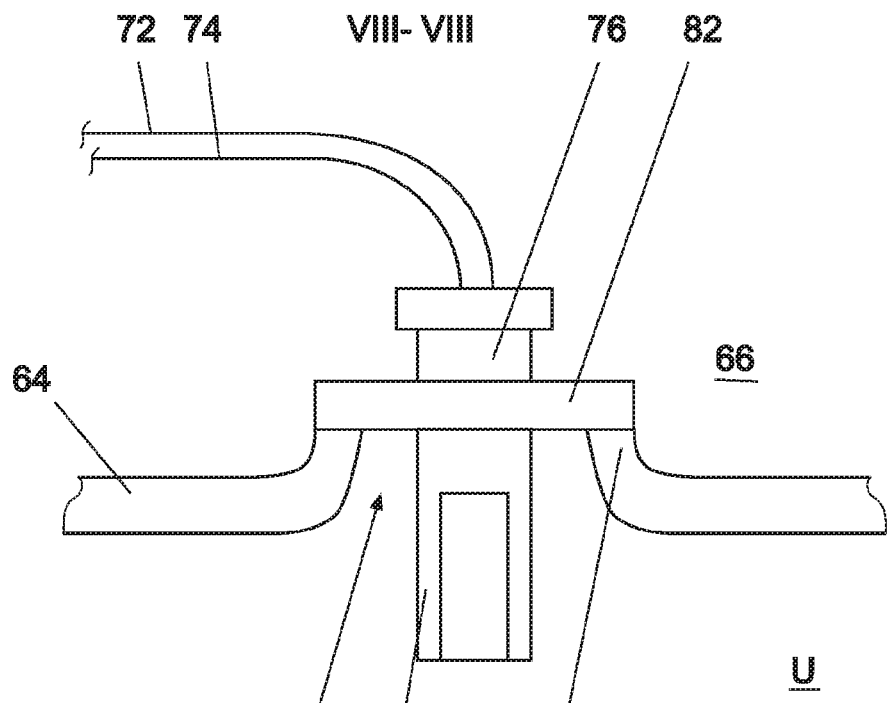
FIG. 8 shows a cross section along VIII-VIII from FIG. 7.

FIG. 8 shows a cross section with the passage opening 80, the plug-in connector 76, the cables 72, 74 and a detail of the wall 64. The plug-in connector 76 has a peripheral collar 82, which is arranged within the storage volume 66 and is welded in a liquid-tight manner to a collar 84, facing the storage volume, of the container wall. The plug-in connector 76 is accordingly seated in the passage opening 80 of the container wall 64 in the present case.

Figure 9:
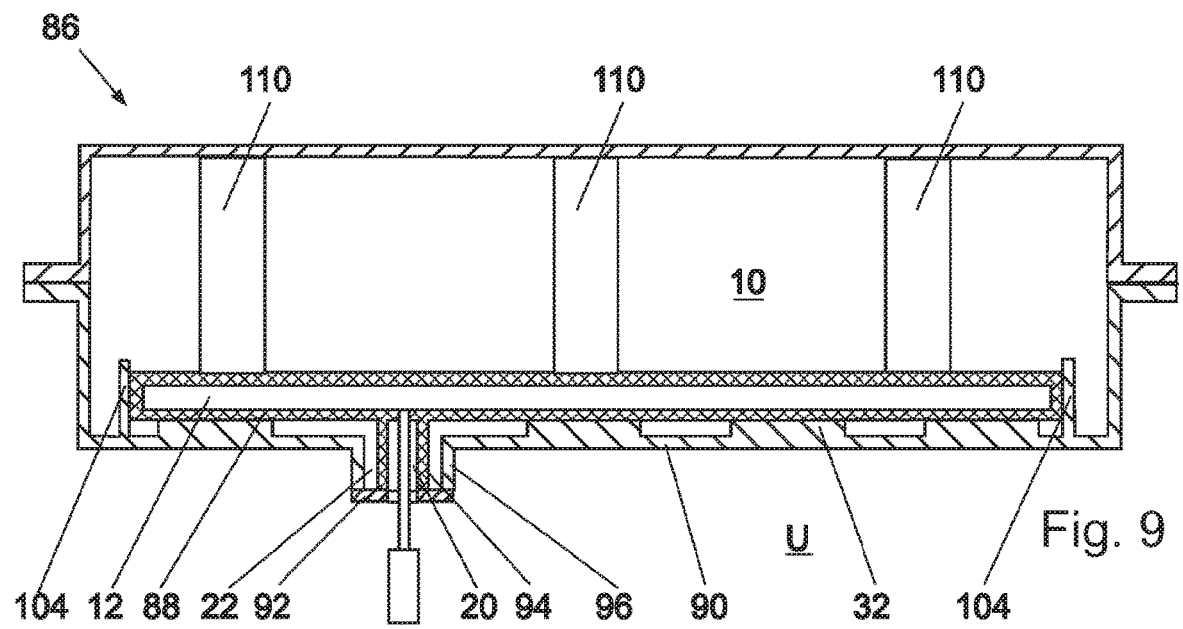
FIG. 9 shows a further liquid container according to the invention.

FIG. 9 shows a further liquid container 86 for a motor vehicle in a cross section. The liquid container 86 differs from the above-described exemplary embodiments in that a housing 88 and a container wall 90 are welded to one another by means of a welding ring 92.

The housing 88 has a housing collar 94, which delimits the first passage opening 20 and extends in the direction of the surroundings U in a manner facing away from the heating element 12 and, at least sectionally, extends within the second passage opening 22, wherein the housing collar 94 is welded to the container wall 90 by means of the welding ring 92.

The container wall 90 has a wall collar 96, which delimits the second passage opening 22 and extends in the direction of the surroundings U in a manner facing away from the heating element 12, wherein the wall collar 96 is welded to the housing 90, to the housing collar 94 in the present case, by means of the welding ring 92.

Figure 10:
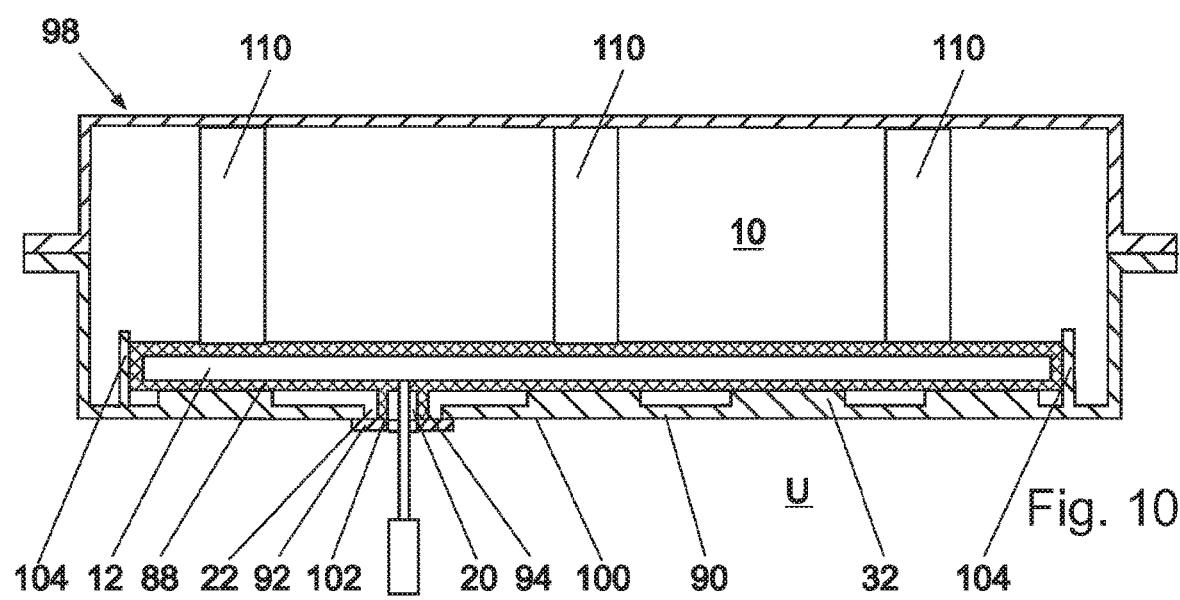
FIG. 10 shows a further liquid container according to the invention.

FIG. 10 shows a further liquid container 98 for a motor vehicle in a cross section. The liquid container 98 differs from the exemplary embodiment shown in FIG. 9 in that the container wall 90 does not have a wall collar. In the present case, the welding ring 92 directly connects an outer side 100, facing away from the storage volume, of the container wall 90 to an end side 102, arranged at the height of the outer side 100, of the housing collar 94. The liquid containers 86, 98 have ribs 104, which are provided on the container wall 90 and form a lateral stop for the positioning of the housing 88 within the storage volume 10. The ribs 104 fix the horizontal position of the housing 88 relative to the container wall 90.

The ribs 104 are assigned to sides of the housing 88 that face away from one another, and border the housing 88 on two sides, with the ribs 104 bearing against the sides of the housing 88 that face away from one another. It goes without saying that the container wall 90 may have further ribs 104, which, as seen in a direction perpendicular to the present cross section, fix the housing 88 horizontally with respect to the container wall 90.

Figure 11:
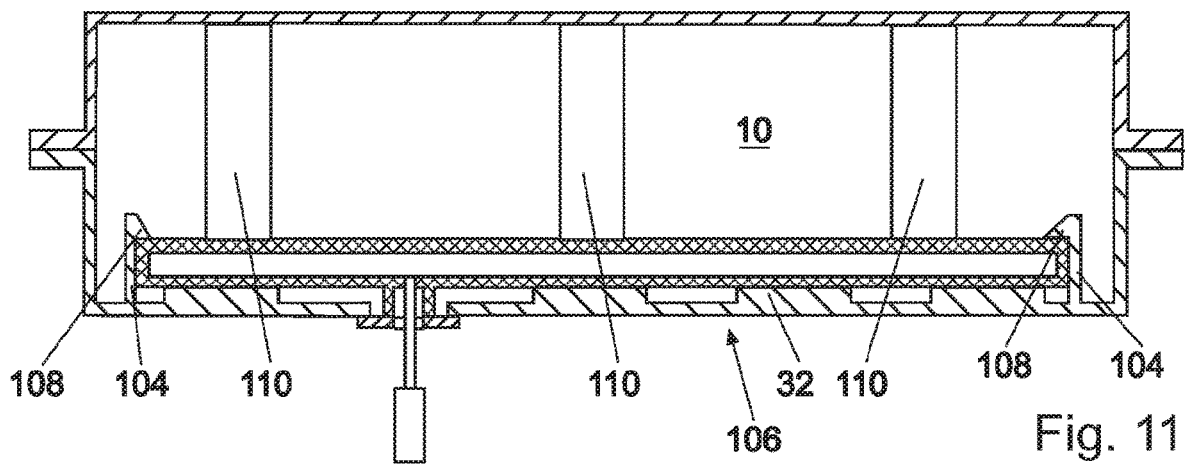
FIG. 11 shows a further liquid container according to the invention.

A liquid container 106 shown in FIG. 11 has detent projections 108, which are formed on the ribs 104 and allow snap-action or clip-type connections and engage around the housing 88 in the manner of barbs. This makes it possible to avoid lifting-off of the housing 88 from the container wall 90.

Lifting-off of the housing 88 from the container wall 90 is furthermore avoided in that provision is made on the container wall 90 of holding-down means 110, which each form a stop for the positioning of the housing 88 within the storage volume 10.

Figure 12:
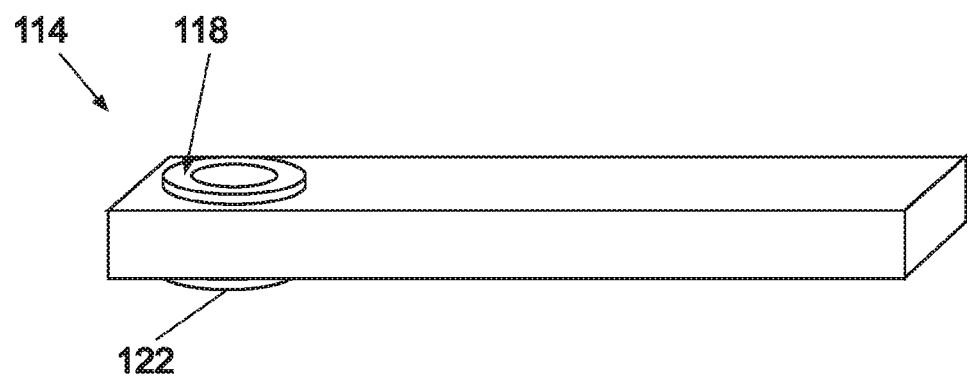
FIG. 12 shows a segment of a heating element.
Figure 13:
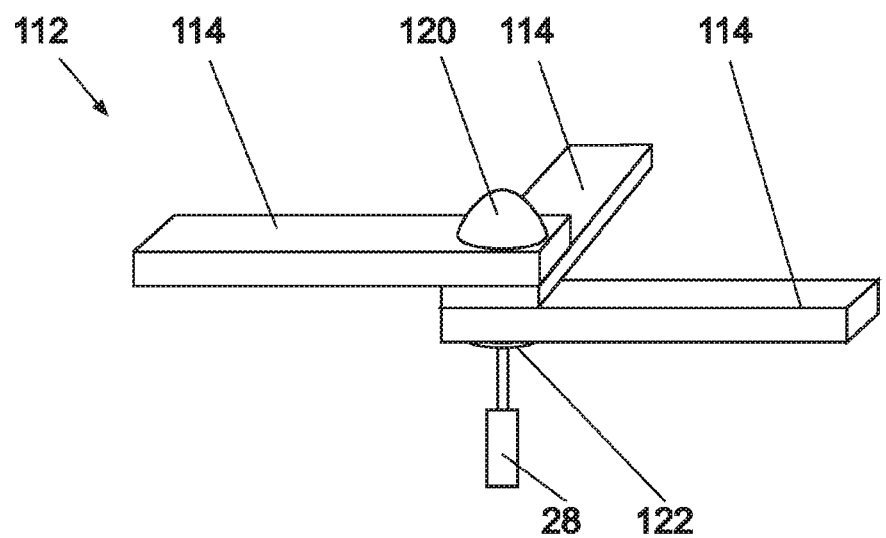
FIG. 13 shows a heating element made up of segments.
Figure 14:
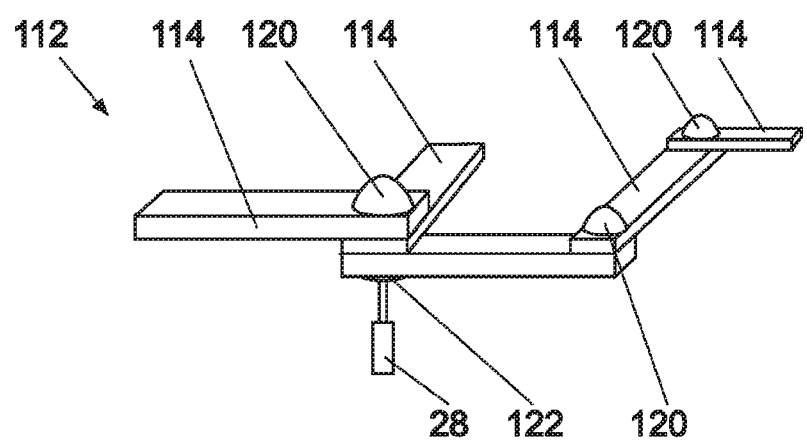
FIG. 14 shows a further heating element made up of segments.
Figure 15:
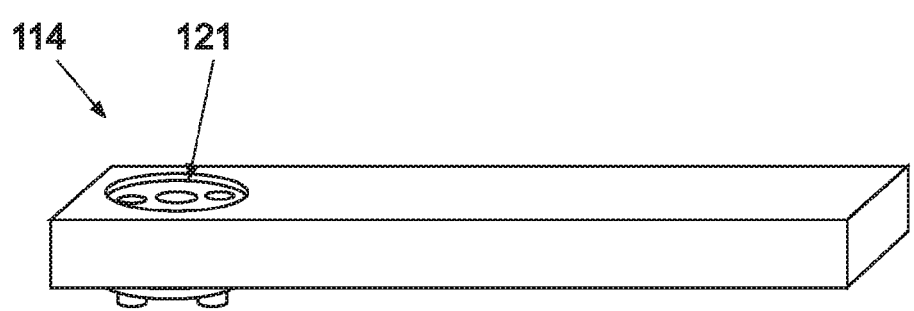
FIG. 15 shows a further segment of a heating element.

As an alternative to the above-described planar plate-type heating elements, a liquid container may have a heating element 112 which has two or more bar-like segments 114 which are arranged with an angular offset in a fan-like manner and/or are arranged in a row in a chain-like manner (FIG. 12, FIG. 13, FIG. 14).

The segments 114 have one or two connection or coupling regions 118, which serve for the electromechanical connection between them and possibly for the connection of a plug-in connector 28. The coupling region 118 may be concealed by a closure cap 120 so as to protect the coupling region from liquid contact. The bar-like segments 114 accordingly have electromechanical connection means 121 which act in a form- and/or force-fitting manner, such as a detent connection, a snap-action connection, a press-stud connection or the like, in order for the bar-like segments 114 to be connected to one another and electrically contacted with one another. The segments 114 may furthermore have a welding collar 122 in order to be welded to one another or to a container wall.

REFERENCE SIGNS

2 Liquid container
4 Top shell
6 Bottom shell
10 Storage volume
12 Heating element
14 Housing
16 Cable leadthrough
18 Cable
20 First passage opening
22 Second passage opening
24 Profile
26 Weld connection
28 Plug-in connector
30 Base
32 Support elements
34 Heating element
36 Cable
38 Cable
40 Plug-in connector
42 Cutouts
44 Bottom shell
46 Housing
48 First passage opening
50 Shaped element
52 Peripheral collar
54 Sleeve
56 Peripheral collar
60 Lower half-shell
62 Top shell
64 Container wall
66 Storage volume
68 Heating element
70 Housing
72 Cable
74 Cable
76 Plug-in connector
78 Connection region
80 Passage opening
82 Collar
84 Collar
86 Liquid container
88 Housing
90 Container wall
92 Welding ring
94 Housing collar
96 Wall collar
98 Liquid container 100 Outer side
102 End side
104 Ribs
106 Liquid container
108 Detent projections
110 Holding-down means
112 Heating element
114 Segments
118 Connection/coupling region
120 Closure cap
121 Electromechanical connection means
122 Welding collar
a Distance
b Wall thickness
c Wall thickness
U Surroundings

What is claimed is:

1. A liquid container for a motor vehicle, comprising:
a container wall, which delimits with respect to surroundings a storage volume for storing liquid;
a heating element, which is arranged in the storage volume;
a housing, wherein the housing encloses the heating element in a liquid-tight manner with respect to the storage volume;
a cable leadthrough, wherein at least one cable for the supply of energy to the heating element is led from the heating element into the surroundings of the liquid container;
wherein the cable leadthrough has a first passage opening, which is formed on the housing, and has a second passage opening, which is formed on the container wall; and
wherein, in the region of the cable leadthrough, the housing and the container wall are connected in a liquid-tight manner.

2. The liquid container as claimed in claim 1, wherein:
a profile extending in the direction of the heating element is integrally formed on the container wall;
the profile delimits the second passage opening; and
the profile, at an end side, is welded in a liquid-tight manner, or is locked with detent action in a liquid-tight manner, to the housing.

3. The liquid container as claimed in claim 1, wherein in the region of the first passage opening, the housing is sealed off with respect to the surroundings.

4. The liquid container as claimed in claim 1, wherein a plug-in connector provided at one cable end of the cable is able to be led through the second passage opening.

5. The liquid container as claimed in claim 1, wherein the housing and the container wall are welded to one another by a welding ring.

6. The liquid container as claimed in claim 5, wherein, the housing has a housing collar which delimits the first passage opening and extends in the direction of the surroundings in a manner facing away from the heating element and at least sectionally, extends within the second passage opening, wherein the housing collar is welded to the container wall by the welding ring.

7. The liquid container as claimed in claim 5, wherein the container wall has a wall collar which delimits the second passage opening and extends in the direction of the surroundings in a manner facing away from the heating element, wherein the wall collar is welded to the housing by the welding ring.

8. A liquid container for a motor vehicle, comprising:
a container wall, which delimits with respect to surroundings a storage volume for storing liquid;
a heating element, which is arranged in the storage volume;
a housing, wherein the housing encloses the heating element in a liquid-tight manner with respect to the storage volume;
at least one cable for the supply of energy to the heating element is led from the heating element to a plug-in connector;
the plug-in connector has a connection region which is arranged outside the storage volume and which faces surroundings of the liquid container; and
the plug-in connector is, in the region of a passage opening of the container wall, connected in a liquid-tight manner to the container wall and closes off the passage opening in the manner of a plug.

9. The liquid container as claimed in claim 8, wherein:
the plug-in connector has a peripheral collar, which is arranged within the storage volume and is connected in a materially bonded and liquid-tight manner to a collar, facing the storage volume, of the container wall; and/or
the plug-in connector is, at least sectionally, seated in the passage opening of the container wall.

10. The liquid container as claimed in claim 1, wherein:
a plurality of support elements extend from the container wall in the direction of the heating element; and
the housing bears on the support elements, and/or is connected to the support elements, such that the heating element is at a distance from the wall.

11. The liquid container as claimed in claim 1, wherein:
the heating element is a plate-type heating means; and/or
the heating element is a PTC heating element; and/or
the heating element is a PTC heating polymer; and/or
the heating element is, at least sectionally, at a distance from the container wall, which delimits the storage volume; and/or
the heating element spans at least 20% of the surface of a container base of the container wall; and/or
the heating element and the housing have passage openings, and/or cutouts, in which shaped elements or functional units of the liquid container are arranged.

12. The liquid container as claimed in claim 1, wherein:
the heating element is cast in the housing; and/or
the housing comprises HDPE and/or PP; and/or
the housing is formed in one piece; and/or
a wall thickness of the housing is 0.5 mm to 3 mm.

13. The liquid container as claimed in claim 1, wherein:
a sleeve which faces away from the storage volume is, as transport protection and/or an assembly aid for cables, plug-in connectors, or contacts, fastened to the housing; and/or
a sleeve which faces away from the storage volume is, as part of the housing, connected in a liquid-tight manner to the container wall, in particular that an end section, facing away from the heating element, of the sleeve is welded, and/or adhesively bonded, in a liquid-tight manner to the container wall.

14. The liquid container as claimed in claim 1, wherein provision is made on the container wall of at least one rib, which forms a stop for the positioning of the housing within the storage volume.

15. The liquid container as claimed in claim 14, wherein two or more ribs are assigned to sides of the housing that face away from one another, and border the housing at least on two sides, wherein the ribs bear in particular against the sides of the housing that face away from one another.

16. The liquid container as claimed in claim 1, wherein provision is made on the container wall of at least one holding-down means, which forms a stop for the positioning of the housing within the storage volume.

17. The liquid container as claimed in claim 1, wherein the heating element has two or more bar-like segments which are arranged with an angular offset in a fan-like manner and/or are arranged in a row in a chain-like manner.

18. The liquid container as claimed in claim 17, wherein the bar-like elements have electromechanical connection means which act in a form- and/or force-fitting manner in order for the bar-like segments to be connected to one another and electrically contacted with one another.

* * * * *